United States Patent [19]
Alder

[11] 4,306,642
[45] Dec. 22, 1981

[54] DRIVING DEVICE FOR A WARPING OR BEAMING MACHINE

[75] Inventor: Günter Alder, Viersen, Fed. Rep. of Germany

[73] Assignee: Gebrüder Sucker, Mönchengladbach, Fed. Rep. of Germany

[21] Appl. No.: 31,336

[22] Filed: Apr. 19, 1979

[30] Foreign Application Priority Data

Apr. 20, 1978 [DE] Fed. Rep. of Germany ....... 2817305

[51] Int. Cl.³ .................... F16D 13/60; F16D 15/00
[52] U.S. Cl. .................... 192/114 R; 192/67 P;
192/91 A; 192/93 C; 192/96; 28/200; 403/324
[58] Field of Search ............... 192/114 R, 96, 67 P,
192/93 C, 101, 71, 91 A; 74/527; 28/190, 200;
403/324, 328

[56] References Cited

U.S. PATENT DOCUMENTS

| 2,137,539 | 11/1938 | McIntosh | 192/67 P |
| 2,450,431 | 10/1948 | Lambach | 28/200 |
| 2,728,130 | 12/1955 | Luchansky | 28/200 X |
| 4,067,425 | 1/1978 | Soter | 192/93 C |

FOREIGN PATENT DOCUMENTS

| 2450757 | 4/1976 | Fed. Rep. of Germany | 128/190 |
| 576451 | 10/1977 | U.S.S.R. | 192/67 P |

Primary Examiner—George H. Krizmanich
Attorney, Agent, or Firm—Herbert L. Lerner

[57] ABSTRACT

Driving device for a beam member of a warping or beaming machine includes a beam member holding piece connected to a beam and a rotatable driving element for the beam member, a clutch shiftable for locking together the driving element and holding piece, in engaged position of the driving device, and for unclocking the driving element and holding piece in disengaged position of the driving machine.

14 Claims, 1 Drawing Figure

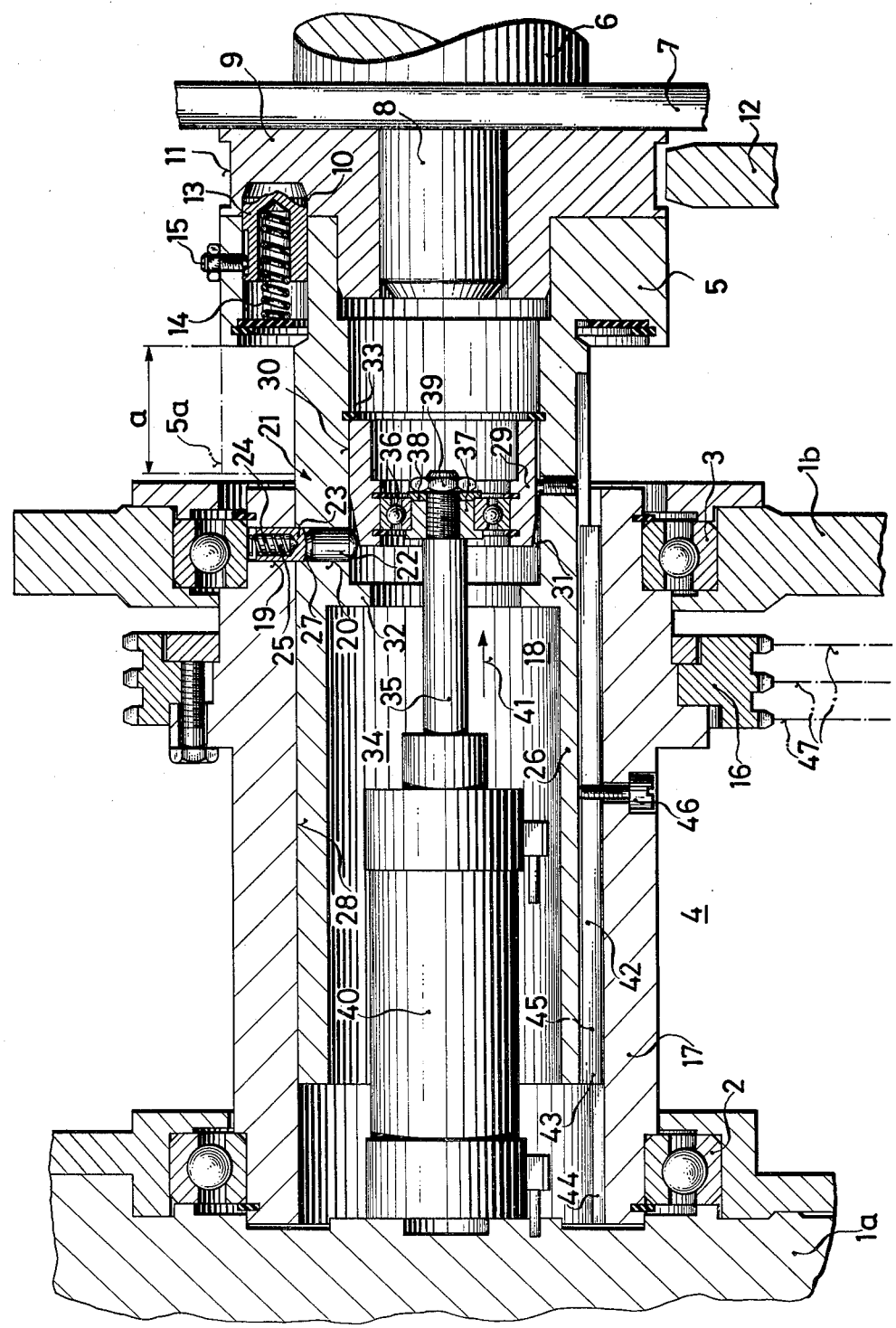

DRIVING DEVICE FOR A WARPING OR BEAMING MACHINE

The invention relates to a driving device for a beam member of a warping or beam machine, including a holding piece for a beam, or for a beam disc or beam neck, and provided with a rotatable driving element. Heretofore, the holding piece on the driving side has been connected rigidly to the rotatable driving element. The devices for clamping and releasing the beam were always located on the side opposite the drive. It was always necessary to shift the beam axially in the direction toward the drive side for clamping.

It is accordingly an object of the invention to provide a driving device for a warping or beaming machine which avoids the herein-afore-mentioned disadvantages of heretofore known devices of this general type and which avoids shifting the beam for clamping and releasing.

With the foregoing and other objects in view, there is provided, in accordance with the invention, in a driving device for a beam member, beam disc or beam neck of a warping or beaming machine having a beam member holding piece and a rotatable driving element and a clutch operator shiftable for locking together the beam member and holding piece as parts of clutch halves, in engaged position of the driving device, and for unlocking the beam member and holding piece in disengaged position of the driving device.

In accordance with another feature of the invention, the driving element includes a hollow shaft carried by a support arm, and a drive gear for rotating the driving element.

In accordance with a further feature of the invention, the clutch operator includes a sleeve which is axially movable within the hollow shaft, forming a parting line therebetween. The shiftable clutch operator now permits movement of the holding piece to the beam and connection to the beam in a positively locking manner.

In accordance with an additional feature of the invention, the beam member includes a beam disc, and/or an adapter connected to the beam disc which is connected to the holding piece, and the sleeve is integral with the holding piece and includes clutch engagement pins extendable from the holding piece in axial direction of the sleeve, the clutch engagement pins being engageable in depressions formed in the beam disc or adapter. Such pins ensure reliable, form-locking driving. They may be loaded by compression springs and engage from a probing position into a driving position if the holding piece or the beam rotates slowly.

In accordance with an added feature of the invention, there is provided an unlockable locking element movable in radially extending upper and lower bores formed in the hollow shaft and the sleeve, respectively.

In accordance with still another feature of the invention, the locking element includes bolt-shaped upper and lower members forming a parting line therebetween, the upper member being slidably disposed in the upper bore, and the lower member being slidable disposed in the lower bore, and a compression spring at least partially disposed in a depression formed in the upper bolt-shaped member and being biased against the hollow shaft.

In accordance with still a further feature of the invention, the bores, in engaged position of the driving device, are aligned and the locking element locks the hollow shaft and sleeve in form-locking engagement. Accordingly, the driving device is locked, after coupling, in the coupling position, equivalent with the engaged position or the driving position. This locking and unlocking action is accomplished, in accordance with still an additional feature of the invention, by providing a switching sleeve disposed within the first-mentioned sleeve, the switching sleeve being movable in axial direction of the first-mentioned sleeve within given limits and having a cylindrical outer surface with a substantially conical chamfer formed therein, in engaged position of the driving device, the switching sleeve being shifted toward the beam and the parting line between the bolt-shaped members being disposed radially inwardly of the parting line between the hollow shaft and the first-mentioned sleeve, and in disengaged position of the driving device, the switching sleeve being shifted away from the beam and the parting line between the bolt-shaped members being coextensive with the parting line between the hollow shaft and the sleeve.

The proposed axially-movable shifting sleeve is advantageously actuated by a clutch-shifting device.

In accordance with still an added feature of the invention, there is provided a clutch-shifting device disposed within the hollow shaft or within the first-mentioned sleeve.

In accordance with yet another feature of the invention, the clutch-shifting device includes a push rod and a bearing connecting the push rod to the switching sleeve.

In accordance with yet a further feature of the invention, there is provided a fluid-pressure operated cylinder having a piston connected to the push rod.

In accordance with yet an additional feature of the invention, the switching sleeve is movable between stops integral with the first-mentioned sleeve, and the first-mentioned sleeve is movable by the clutch-shifting device when the switching sleeve reaches one of the stops. The clutch-shifting device accordingly serves not only for locking and unlocking the clutch but also for the coupling and uncoupling itself.

The locking elements which are to lock the clutch in the engaged condition, need not transmit torques at the same time. For transmitting a torque from the driving element through the clutch, and the holding piece connected to the clutch to the beam, in accordance with a concomitant feature of the invention, there is provided a key axially movable in an axially extending slot formed in the hollow shaft to lock the first-mentioned sleeve to the hollow shaft.

The advantages obtained with the invention are, in summary, that a reliably engageable and disengageable shifting clutch is provided on the drive side of the beam which makes it possible to grip and take along the beam in a form-locking manner without the need for moving the beam in the axial direction. For this purpose, a suitable device, without a driving element, however, is required on the opposite side of the beam. The latter device can be dispensed with if axial movement of the beam when clamping and releasing, can be tolerated. In that case, the invention still provides the advantage of a compact clamping device integrated with the driving device in the form of a clutch with elements driving the beam in a form-locking manner.

Since the clutch-shifting device is stationary and does not rotate, the clutch-shifting device can also be alternatively operated by a hand lever through the push rod.

Thus, there are still further possibilities for simplification.

Other features which are considered as characteristic for the invention are set forth in the appended claims.

Although the invention is illustrated and described herein as embodied in driving device for a warping or beaming machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which the single FIGURE of the drawing is a cross-sectional view of an embodiment of the invention.

BRIEF DESCRIPTION OF THE DRAWINGS

The single FIGURE of the drawing is a fragmentary diagrammatic, cross-sectional view of the driving device of the invention.

Referring now, particularly, to the FIGURE of the drawing, there is seen a driving device having a clutch with a first driven clutch half, a second driving clutch half, clutch engagement pins, a clutch operator and a two-part support arm 1a, 1b of a beaming machine which is not shown in detail. The two-part support arm, by means of ball bearings 2, 3 supports a driving device including a rotatable driving element 4 and a holding piece 5 of the second clutch half. The holding piece 5 serves for directly holding a beam 6 of a beam member which may also include a beam disc 7 and a beam neck 8. In addition, the beam 6 of the beam member carries an adapter 9 connected to the beam disc 7. The adapter 9 has several depressions 10 uniformly distributed over the circumference and a concentric groove 11 which serves for placing the beam on a beam support lever when it is being clamped or released. The depressions may, however be formed in the beam disc 7.

The flange-like holding piece 5 carries clutch engagement pins 13 which are aligned parallel to the axis of the beam 6 and can detent or project into the depressions 10 of the adapter 9. The clutch engagement pins have the shape of bolts and are each loaded by a compression spring 14. A locked set screw 15 prevents the clutch engagement pin 13 from falling out. The driving element 4 includes a hollow shaft 17 provided with a driving gear 16.

Inside the hollow shaft 17, a clutch operator 18 which can be switched and locked is seen. The clutch operator 18 has an axially movable clutch sleeve 26, to which the holding piece 5 is rigidly connected. In addition, the clutch has switchable locking elements which are radially movable and are supported in radially aligned holes 19 and 20, respectively, of the hollow shaft 17 and the clutch sleeve 26. Three locking elements are uniformly distributed over the circumference. In some circumstances, only one locking element would be sufficient. One of these locking elements is visible in the drawing and is designated overall with reference 21. The locking element 21 includes three parts, i.e., a bolt-like lower part 22, a bolt-like upper part 23 and a compression spring 24 which is supported in a depression 25 of the upper part 23 and exerts a radially inwardly directed force on the locking element 21.

The radially directed holes 19, 20 of the hollow shaft 17 and the clutch sleeve 26 are disposed so as to be lined up in the clutch position shown in the drawing, which is the engaged position or driving position. In this position, the locking element 21 can lock the hollow shaft 17 and the clutch sleeve 26 in a form-locking manner by snapping in, in a pawl and detent fashion. This form-locking detention is shown in the drawing. It can be seen that the parting gap 27 between the upper part 23 and the lower part 22 lies outside the parting line 28 between the hollow shaft 17 and the clutch sleeve 26.

Another part of the clutch operator 18 is a switching sleeve 29 which is disposed within the clutch sleeve 26 and is axially movable within limits. The switching sleeve 29 has a cylindrical outer surface 30 with a detent or conical chamfer 31. The switching sleeve 29 is movably supported between stops 32 and 33 of the clutch sleeve 26. In this way, two preferred switching positions for the switching sleeve 29 are obtained. These are, namely, an engaged position which is shown in the drawing, and a disengaged position. In the engaged position, the switching sleeve 29 is moved in the direction toward the beam 6, as shown. The locking element 21 is in the engaged position of the driving device as well. In the disengaged position, on the other hand, the switching sleeve 29 is moved in the opposite direction. When it is moved in the opposite direction, the lower part 22 slides upward on the chamfered part 31 until the parting line 27 between the upper part 23 and the lower part 22 lies on or is coextensive with the parting line 28 between the hollow shaft 17 and the clutch sleeve 26.

Inside the hollow shaft 17 and the clutch sleeve 26, a clutch-shifting device of the clutch operator 18 designated as a whole with reference numeral 34 is disposed. This clutch-shifting device 34 has a push rod 35 which is connected to the switching sleeve 29 of the clutch 18 through a bearing, which in the present case is an antifriction bearing 36. The connection is effected by a bushing 37, a washer 38 and a nut 39. Another part of the clutch-shifting device 34 of the clutch 18 is a cylinder 40 which is operated with a pneumatic pressure medium. The push rod 35 is connected to the piston of the cylinder 40.

It is seen from the construction of the switching sleeve 29 that the clutch sleeve 26 is also axially movable by means of the clutch-shifting device 34. If the push rod 35 is moved in the direction of the arrow 41, the clutch sleeve 26 is moved along by the switching sleeve 29 as soon as the switching sleeve has reached stop 33. In the disengaged position of the driving device, the holding piece 5 is displaced by the amount a and occupies the position 5a shown by dot-dash lines.

A slot-and-key arrangement 42 is furthermore provided so that the locking elements 21 need not transmit the torque alone. The key 43 is fixed in the slot 44 of the hollow shaft 17 by a fastening screw 46. The slot 44 in the clutch sleeve 26 has play relative to the key 43, so that the clutch sleeve 26 can easily slide on the key 43 in the axial direction.

Before the beam 6 is clamped, the adapter 9 initially rests on the beam support lever 12. Furthermore, the clutch operator 18 is disengaged, the push rod 35 is pushed all the way to the left against the direction of the arrow 41, the switching sleeve 29 is in front of the stop 32, the locking element 21 is in the unlocked position and the holding piece is in position 5a.

With the drive switched off, i.e., with the drive gear 16 standing still, fluid pressure medium such as air or hydraulic fluid is admitted to the cylinder 40, so that the push rod 35 is moved in the direction of the arrow 41 until all parts have occupied the position shown in the drawing. The clutch engagement pins 13 will initially not yet be located in front of the depressions 10 of the adapter 9. They will therefore be sprung back at first. If the beam disc 7 is turned slowly or the drive gear 16 is rotated slowly by the drive when shifted into low gear, the clutch engagement pins 13 will finally drop into the depressions 10 of the adapter 9. The coupling process is completed therewith and the drive gear 16 can be brought up to the operating speed by means of chains 47, indicated by dot-dash lines, which are connected to a non-illustrated drive.

The clutch is disengaged in the reverse order of actions after the drive gear has been stopped. As soon as the beam neck 8 with the adapter 9 is outside the range of the holding piece 5 or the clutch engagement pins 13, respectively, the beam can be lowered by means of the beam support lever 12.

The invention is not limited to the embodiment example shown and described. The drawing is merely to give an example for a practical, operationally reliable construction.

There is claimed:

1. A driving device for a beam member of a warping or beaming machine, comprising a first clutch half integral with the beam member, a second clutch half integral with a beam member holding piece, means for engaging said clutch halves, means for locking said clutch halves together, a rotatable driving element for the holding piece, and a clutch operator for activating said engaging and locking means for engaging and locking said holding piece to the beam member, said driving element including a hollow shaft carried by a support arm and a drive gear for rotating said driving element, said clutch operator including a sleeve being axially movable within said hollow shaft forming a parting line therebetween, and said locking means including an unlockable locking element movable in radially extended upper and lower bores formed in said hollow shaft and said sleeve, respectively, in engaged position of the driving device, said bores being aligned and said locking element locks said hollow shaft and clutch sleeve in locking engagement.

2. Driving device according to claim 1, wherein the beam member includes a beam disc connected to said holding piece.

3. Driving device according to claim 1, wherein the beam member includes a beam neck connected to said holding piece.

4. Driving device according to claim 1, wherein said sleeve is integral with said holding piece and includes clutch engagement pins extendable from said holding piece in axial direction of said sleeve, said clutch engagement pins being engageable in depressions formed in said beam member.

5. Driving device according to claim 4, wherein the beam member includes an adapter connected to said beam disc, said depressions being formed in said adapter.

6. Driving device according to claim 1, wherein said locking element includes bolt-shaped upper and lower members forming another parting line therebetween, said upper member being slidably disposed in said upper bore, and said lower member being slidably disposed in said lower bore, and a compression spring at least partially disposed in a depression formed in said upper bolt-shaped member and being biased against said hollow shaft.

7. Driving device according to claim 6, including a switching sleeve disposed within said first-mentioned sleeve, said switching sleeve being movable in axial direction of said first-mentioned sleeve within given limits and having a cylindrical outer surface with a substantially conical chamfer formed therein, in engaged position of the driving device, said switching sleeve being shifted toward said beam member and said other parting line between said bolt-shaped members being disposed radially inwardly of said parting line between said hollow shaft and said first-mentioned sleeve, and in disengaged position of the driving device, said switching sleeve being shifted away from said beam member and said other parting line between said bolt-shaped members being coextensive with said parting line between said hollow shaft and said first-mentioned sleeve.

8. Driving device according to claim 7, including a clutch shifting device disposed within said hollow shaft.

9. Driving device according to claim 7, wherein said first-mentioned shifting device is disposed within said clutch sleeve.

10. Driving device according to claim 9, wherein said clutch shifting device includes a push rod and a bearing connecting said push rod to said switching sleeve.

11. Driving device according to claim 10, including a fluid-pressure operated cylinder having a piston connected to said push rod.

12. Driving device according to claim 9, wherein said switching sleeve is movable between stops integral with said first-mentioned sleeve, and said first-mentioned sleeve is movable by said clutch shifting device when said switching sleeve reaches one of said stops.

13. Driving device according to claim 1 including a key axially movable in an axially extending slot formed in said hollow shaft to lock said sleeve to said hollow shaft.

14. Device according to claim 1, wherein said clutch cannot be released until said locking means are unlocked.

* * * * *